United States Patent
Valient et al.

(10) Patent No.: US 10,657,619 B2
(45) Date of Patent: May 19, 2020

(54) TASK EXECUTION ON A GRAPHICS PROCESSOR USING INDIRECT ARGUMENT BUFFERS

(71) Applicant: Apple Inc., Cupertino, CA (US)

(72) Inventors: Michal Valient, San Jose, CA (US); Sean P. James, Sunnyvale, CA (US); Gokhan Avkarogullari, San Jose, CA (US); Alexander K. Kan, Huntington Woods, MI (US); Michael Imbrogno, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/612,796

(22) Filed: Jun. 2, 2017

(65) Prior Publication Data
US 2018/0350029 A1 Dec. 6, 2018

(51) Int. Cl.
*G06T 1/60* (2006.01)
*G06F 3/14* (2006.01)
(Continued)

(52) U.S. Cl.
CPC .............. *G06T 1/60* (2013.01); *G06F 3/14* (2013.01); *G06F 9/4484* (2018.02); *G06T 1/20* (2013.01);
(Continued)

(58) Field of Classification Search
CPC .......... G06T 1/60; G06T 1/20; G06T 15/005; G06T 15/04; G06F 9/4484; G06F 3/14; G09G 5/363
(Continued)

(56) References Cited

U.S. PATENT DOCUMENTS 9,342,857 B2 5/2016 Kubisch
9,390,540 B2 7/2016 Uralsky
(Continued)

OTHER PUBLICATIONS

Phillipe C.D. Robert et al., "GPU-Based Ray-Triangle Intersection Testing," Jan. 1, 2004 (Jan. 1, 2004), pp. 1-14, KP055509925, Bern, Retrieved from the Internet: URL: http://tr.inf.unibe.ch/pdf/iam-04-004.pdf [retrieved on Sep. 26, 2018].
(Continued)

*Primary Examiner* — King Y Poon
*Assistant Examiner* — Vincent Peren
(74) *Attorney, Agent, or Firm* — Blank Rome LLP

(57) ABSTRACT

The disclosure pertains to techniques for operation of graphics systems and task execution on a graphics processor. One such technique comprises a computer-implemented method for task execution on a graphics processor, the method comprising creating a data structure for grouping data resources, populating the data structure with two or more data resources for encoding into a graphics processing language by an encoding object, passing the data structure to a first programming interface command, the first programming interface command configured to access the data structure's data resources, triggering execution of a first function on a graphics processor in response to passing the data structure to the first programming interface command, passing the data structure to a second programming interface command, the second programming interface command configured to access the data structure's data resources, and triggering execution of a second function on the graphics processor in response to passing the data structure to the second programming interface command.

21 Claims, 8 Drawing Sheets

(51) Int. Cl.
*G06T 1/20* (2006.01)
*G09G 5/36* (2006.01)
*G06T 15/00* (2011.01)
*G06T 15/04* (2011.01)
*G06F 9/448* (2018.01)

(52) U.S. Cl.
CPC ............ *G06T 15/005* (2013.01); *G06T 15/04* (2013.01); *G09G 5/363* (2013.01)

(58) Field of Classification Search
USPC ........................................................ 345/501
See application file for complete search history.

(56) References Cited

U.S. PATENT DOCUMENTS

| | | | |
|---|---|---|---|
| 2005/0046628 A1* | 3/2005 | Hux | ...................... G06T 15/005 345/420 |
| 2005/0231522 A1* | 10/2005 | Poddar | .................. G06T 15/005 345/582 |
| 2006/0232595 A1* | 10/2006 | Junkins | ...................... G06T 1/60 345/557 |
| 2013/0300752 A1* | 11/2013 | Grover | ...................... G06F 9/54 345/520 |
| 2016/0210719 A1 | 7/2016 | Pelton | |

OTHER PUBLICATIONS

Extended European Search Report received in European Patent Application No. 18174304.8, dated Oct. 15, 2018.

\* cited by examiner

| 370 APPLICATION A | 371 PHOTOS | 372 QUICKEN | 373 IMOVIE | 374 APPLICATION B |
|---|---|---|---|---|
| 360 OTHER APPLICATION SERVICES | 361 SPRITE KIT | 362 SCENE KIT | 363 CORE ANIMATION | 364 CORE GRAPHICS |
| 350 O/S SERVICES | 351 OPENGL | 352 METAL | 353 SOFTWARE RAYTRACER | 354 SOFTWARE RASTERIZER |
| O/S KERNEL 345 | | | | |
| HARDWARE 340 | | | | |

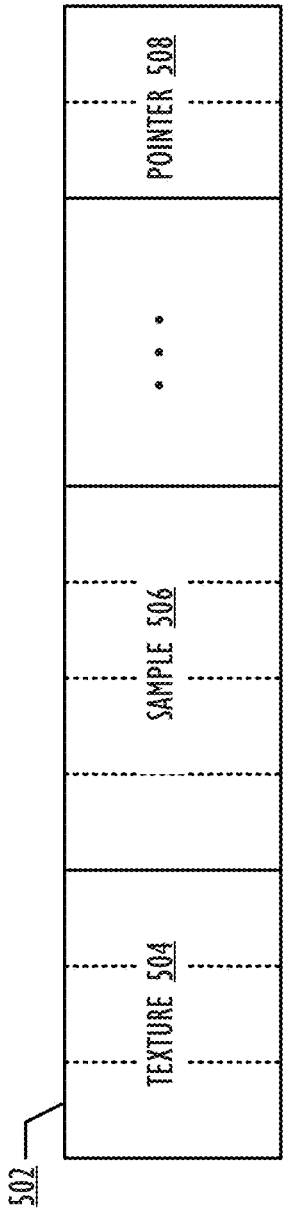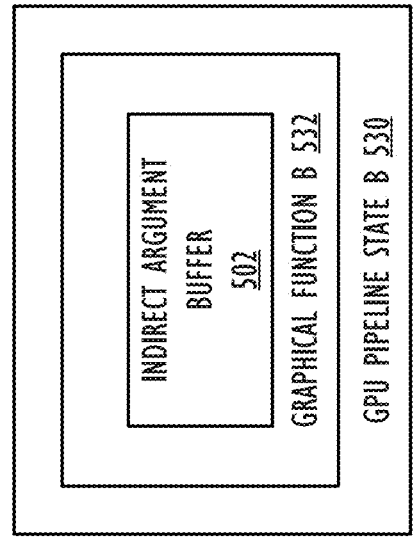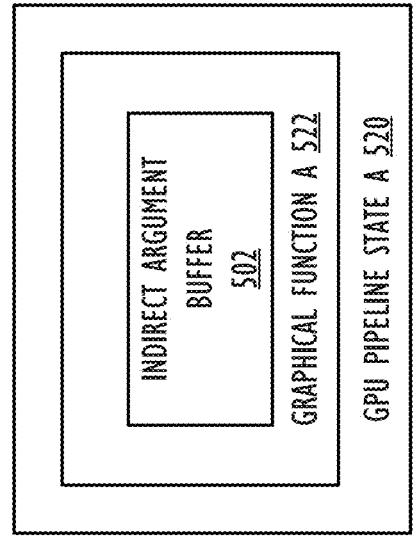

TASK EXECUTION ON A GRAPHICS PROCESSOR USING INDIRECT ARGUMENT BUFFERS

BACKGROUND

The subject matter disclosed herein relate to the field of graphics processing and, without limitation, techniques for task execution on a graphics processor using indirect argument buffers.

Graphics processing units (GPUs) have become important for processing data-parallel graphics tasks. Developers now recognize that non-graphics data-parallel tasks can also be handled by GPUs, taking advantage of their massive parallel capabilities. Vendors and standards organizations have created application programming interfaces (APIs) that make graphics data-parallel tasks easier to program. However, there are also low-level APIs (or libraries/frameworks etc.) that reside closer to hardware and are generally employed by applying the output of higher-level APIs. In other words, the higher-level APIs generally prepare program code for application to the lower-level APIs.

To take advantage of certain GPU capabilities, it may be necessary to pass a set of resources to the GPU via multiple API calls. Each API call has a non-insignificant overhead cost associated with it. Additionally, where a particular set of resources are used from frame to frame, passing this set of resources repeatedly for multiple API calls over possibly multiple frames may be resource inefficient and time consuming.

SUMMARY

This disclosure relates generally to the field of computer programming. More particularly, but not by way of limitation, aspects of the present disclosure relates to a computer-implemented method for task execution on a graphics processor, the method comprising creating a data structure for grouping data resources, populating the data structure with two or more data resources for encoding into a graphics processing language by an encoding object, passing the data structure to a first programming interface command, the first programming interface command configured to access the data structure's data resources, triggering execution of a first function on a graphics processor in response to passing the data structure to the first programming interface command, passing the data structure to a second programming interface command, the second programming interface command configured to access the data structure's data resources, and triggering execution of a second function on the graphics processor in response to passing the data structure to the second programming interface command.

Another aspect of the present disclosure relates to a computer-implemented method for task execution on a graphics processor, the method comprising receiving a request to encode a data structure into a graphics processing language, the data structure for grouping two or more data resources, the request having an indication that the data structure may be re-indexed, determining whether to re-index the data structure based on one or more characteristics of the graphics processor, encoding the data resources into an allocated memory for the data structure based on the determination, receiving a first call for a first programming interface command, the first call including the data structure, executing a first function on the graphics processor in response to the first call, wherein executing the first function includes accessing the data structure's data resources, receiving a second call for a second programming interface command, the second call including the data structure, and executing a second function on the graphics processor in response to the second call, wherein executing the second function includes accessing the data structure's data resources receiving a request to create a data structure for grouping data resources.

Another aspect of the present disclosure relates to a non-transitory program storage device, readable by a processor and comprising instructions stored thereon to cause one or more processors to create a data structure for grouping data resources, populate the data structure with two or more data resources for encoding into a graphics processing language by an encoding object, pass the data structure to a first programming interface command, the first programming interface command configured to access the data structure's data resources, trigger execution of a first function on a graphics processor in response to passing the data structure to the first programming interface command, pass the data structure to a second programming interface command, the second programming interface command configured to access the data structure's data resources, and trigger execution of a second function on the graphics processor in response to passing the data structure to the second programming interface command.

Another aspect of the present disclosure relates to a non-transitory program storage device, readable by a processor and comprising instructions stored thereon to cause one or more processors to receive a request to encode a data structure into a graphics processing language, the data structure for grouping two or more data resources, the request having an indication that the data structure may be re-indexed, determine whether to re-index the data structure based on one or more characteristics of the graphics processor, encode the data resources into an allocated memory for the data structure based on the determination, receive a first call for a first programming interface command, the first call including the data structure, execute a first function on the graphics processor in response to the first call, wherein executing the first function includes accessing the data structure's data resources, receive second call for a second programming interface command, the second call including the data structure; and execute a second function on the graphics processor in response to the second call, wherein executing the second function includes accessing the data structure's data resources.

The architecture implied by these embodiments provides a level of indirection between an application's use of graphics and the way the graphics are actually rendered. Therefore, the aforementioned embodiments allow an application program (and its developer) to disregard the graphics backend. This has many advantages. For example, by managing the graphics backend independently, any improvements made in the backend may accrue to application programs without any change to the application code. Thus, if there is new improved hardware and improved low-level libraries to take advantage of the hardware, under some embodiments, even old applications might take advantage of new features.

BRIEF DESCRIPTION OF THE DRAWINGS

FIG. 3 shows an illustrative software layer and architecture diagram.

FIGS. 5A, 5B, and 5C illustrate an indirect argument buffer and usage thereof, according to an embodiment.

DETAILED DESCRIPTION

Figure 1:
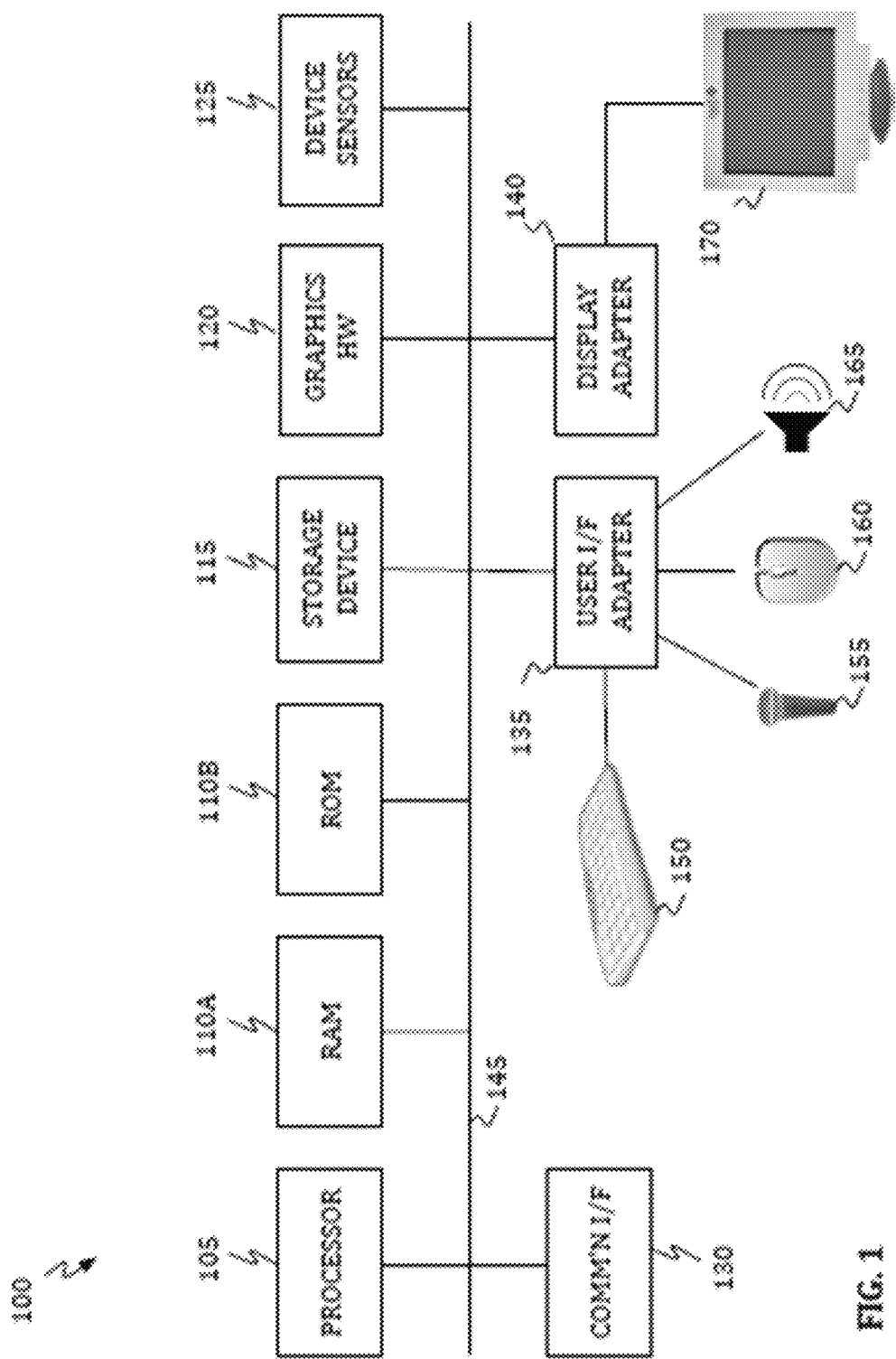
FIG. 1 shows a representative computer node that may be used, for example, as an end-user machine or a developer machine.

This disclosure pertains to systems, methods, and computer readable media to improve the operation of graphics systems. More specifically, aspects of the present disclosure relates to task execution on a graphics processor. Task execution on programmable pipelines of a graphics processor generally includes various inputs, such as those setting up a task for execution, along with the inputs to that task. For example, information related to a rendering task may include instructions for the rendering itself, information related to the shapes being rendered, textures overlay the shapes, lighting information, etc. Information may be grouped into a set of information and input into the graphics processor from a higher level program using a using a single data structure to pass the set of information to the graphics processor. This set of information may be stored in a location accessible by both application code executing on a central processing unit (CPU), as well as by code executing on a graphical processing unit (GPU). This data structure may also be reused for multiple function calls.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the claimed subject matter, leaving resorting to the claims as a potential necessity to determine such claimed subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of graphical processor interface software or graphical processing systems.

Exemplary Hardware and Software

The embodiments described herein may have implication and use in and with respect to all types of devices, including single- and multi-processor computing systems and vertical devices (e.g., cameras, gaming systems, appliances, etc.) that incorporate single- or multi-processing computing systems. The discussion herein is made with reference to a common computing configuration that may be discussed as a software development system or an end-user system. This common computing configuration may have a CPU resource including one or more microprocessors. This discussion is only for illustration regarding sample embodiments and is not intended to confine the application of the claimed subject matter to the disclosed hardware. Other systems having other known or common hardware configurations (now or in the future) are fully contemplated and expected. With that caveat, a typical hardware and software operating environment is discussed below. The hardware configuration may be found, for example, in a server, a workstation, a laptop, a tablet, a desktop computer, a gaming platform (whether or not portable), a television, an entertainment system, a smart phone, a phone, or any other computing device, whether mobile or stationary.

Referring to FIG. 1, the disclosed embodiments may be performed by representative computer system 100. For example the representative computer system may act as a software development platform or an end-user device. System 100 may be embodied in any type of device such as a general purpose computer system, a television, a set top box, a media player, a multi-media entertainment system, an image processing workstation, a hand-held device, or any device that may be coupled with or may incorporate display or presentation devices as discussed herein. Computer system 100 may include one or more processors 105, memory 110 (110A and 110B), one or more storage devices 115, and graphics hardware 120. Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning again to FIG. 1, system 100 may also include communication interface 130, user interface adapter 135, and display adapter 140—all of which may be coupled via system bus, backplane or communication fabric 145, which may comprise one or more switches or one or more continuous (as shown) or discontinuous communication links. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program code or instructions organized into one or more modules and written in any desired computer programming language, and any other suitable data. When executed by processor 105 and/or graphics hardware 120, such computer program code or instructions may implement one or more of the methods or processes described herein. Communication interface 130 may include semiconductor-based circuits and be used to connect computer system 100 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Ethernet, WiFi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170.

Processor 105 may execute instructions necessary to carry out or control the operation of many functions performed by system 100 (e.g., evaluation, transformation, and compilation of graphics programs). Processor 105 may, for instance, drive display 170 and receive user input from user interface adapter 135 or any other user interfaces embodied by the system. User interface 135, for example, can take a variety of forms, such as a button, a keypad, a dial, a click wheel, a keyboard, a display screen, and/or a touch screen. Processor 105 may be any type of computing device such as one or more microprocessors working alone or in combination with GPUs, DSPs, system-on-chip devices such as those found in mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs. System 100 (implementing one or more embodiments discussed herein) can provide the means for one or more users to control the same system (e.g., system 100) or another system (e.g., another computer or entertainment system) through user activity, which may include natural activity and/or predetermined gestures such as hand gestures.

Various embodiments of the disclosed subject matter may employ sensors, such as cameras. Cameras and like sensor systems may include auto-focus systems to accurately capture video or image data ultimately used to interpret user intent or commands. Since the motion of the user may be based upon subtle activity in small regions in the captured images (e.g., hands, fingers, face, mouth, brow etc.) the autofocus system may be used to separately focus on multiple regions of the image in order to access better information. Returning to FIG. 1, sensors 125 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis. If the time is 3:00 a.m., it is more likely that a user's face indicates sleepiness than sadness.

Figure 2:
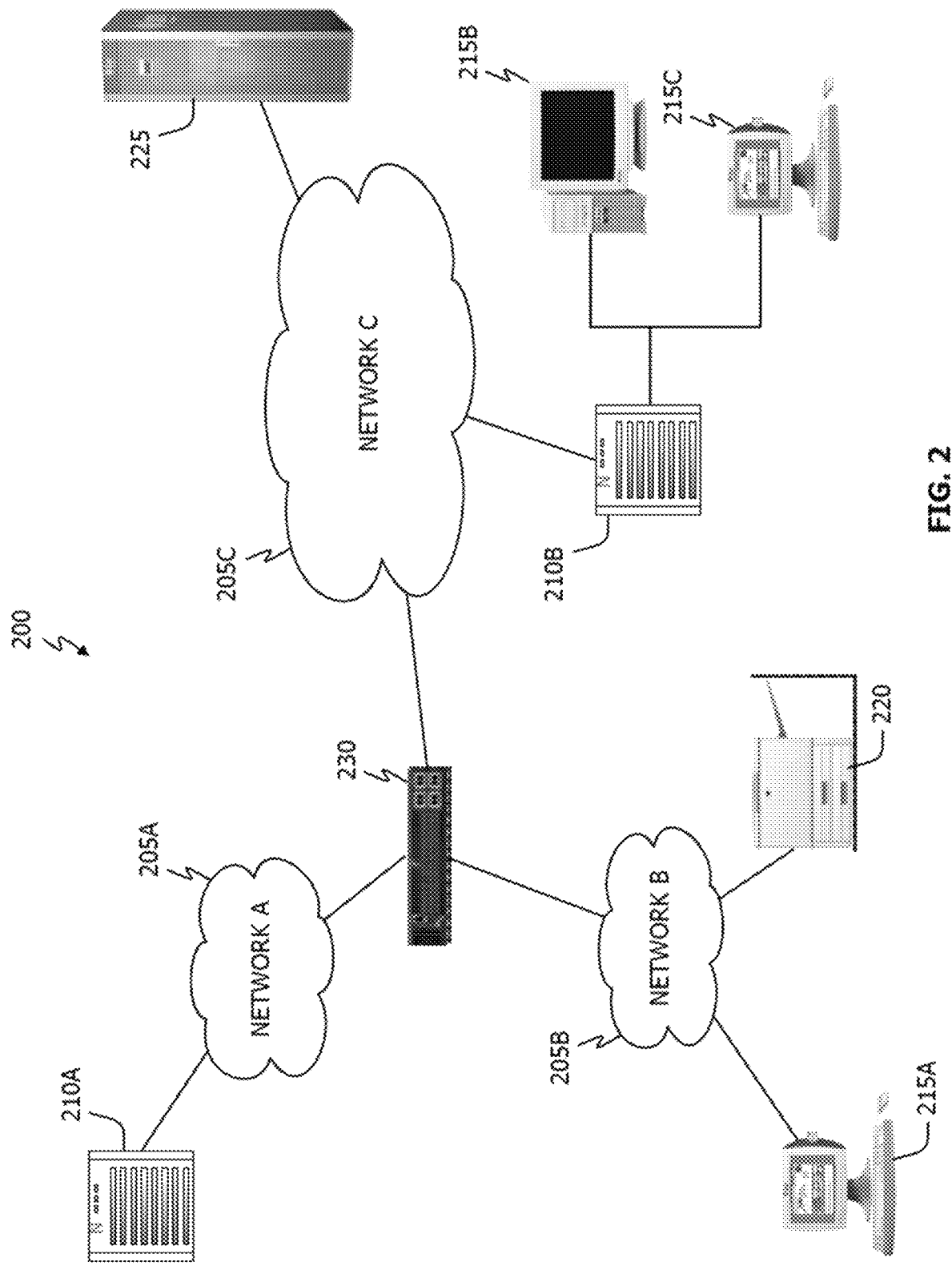
FIG. 2 shows an illustrative network environment associated with one or more embodiments.

FIG. 2 depicts illustrative network architecture 200, within which the disclosed techniques may be implemented and the disclosed hardware may reside. This illustrative network 200 may include a plurality of networks 205, (i.e., 205A, 205B, and 205C), each of which may take any form including, but not limited to, a local area network (LAN) or a wide area network (WAN), such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and also capable of communicating over networks 205. One embodiment using server computers may involve the operation of one or more central systems to process graphics information and distribute the processed information to nodes on a network.

Client computers 215 (i.e., 215A, 215B, and 215C), which may take the form of any smartphone, gaming system, tablet, computer, set top box, entertainment device/system, television, telephone, communications device, or intelligent machine, including embedded systems, may also be coupled to networks 205, and/or data server computers 210. In some embodiments, network architecture 210 may also include network printers such as printer 220 and storage systems such as 225, which may be used to store multimedia items or other data that are referenced herein. To facilitate communication between different network devices (e.g., data servers 210, end-user computers 215, network printer 220, and storage system 225), at least one gateway or router 230 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet-capable ICs. Further, the devices may carry network adapters for any network in which they might participate (including, but not limited to, PANs, LANs, WANs, and cellular networks).

As noted above, embodiments of the subject matter disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams, which software developers tend to express in somewhat differing ways. In this case, the description begins with the base hardware layer 395 illustrating hardware 340, which may include CPUs and GPUs or other processing and/or computer hardware. Above the hardware layer is the O/S kernel layer 390 showing an example O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer exemplified by O/S services 350. O/S services may provide core O/S functions in a protected environment. In addition, O/S services shown in layer 385 may include frameworks for OpenGL® 351 (OpenGL is a registered trademark owned by Silicon Graphics Inc.), Metal® 352 (Metal is a registered trademark owned by Apple Inc.), Software Raytracer 353, and a Pure Software Rasterizer 354. These particular examples all relate to graphics and/or graphics libraries and are chosen to illuminate the topic of many embodiments herein which relate to graphics handling. These particular examples also represent graphics frameworks/libraries that may operate in the lower tier of frameworks, such that developers may use shading and graphics primitives and/or obtain fairly tightly coupled control over the graphics hardware. In addition, the particular examples named in FIG. 3 may also pass their work product on to hardware or hardware drivers.

Referring again to FIG. 3, OpenGL 351 represents an example of a well-known library and application-programming interface (API) for graphics rendering including 2D and 3D graphics. Metal 352 also represents a published graphics library and framework, but it is lower level than OpenGL 351, supporting fine-grained, low-level control of the organization, processing, and submission of graphics and computation commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphics hardware (e.g., using only the CPU). These libraries or frameworks shown within the O/S services layer 385 are only exemplary and intended to show the general level of the layer and how it relates to other software in a sample arrangement (e.g., kernel operations usually below and higher-level Applications Services 360 usually above). In addition, it may be useful to note that Metal 352 represents a published framework/library of Apple Inc. that is known to developers in the art. Furthermore, OpenGL 351 may represent a framework/library present in current versions of software distributed by Apple Inc.

Above the O/S services layer 385 there is an Application Services layer 380, which includes SpriteKit® 361, SceneKit® 362, Core Animation® 363, and Core Graphics 364 (SpriteKit, SceneKit, and Core Animation are registered trademarks owned by Apple Inc.). The O/S services layer represents higher-level frameworks that are commonly directly accessed by application programs. In some embodiments, the O/S services layer includes graphics-related frameworks that are high level in that they are agnostic to the underlying graphics libraries (such as those discussed with respect to layer 385). In such embodiments, these higher-level graphics frameworks are meant to provide developer access to graphics functionality in a more user/developer friendly way and allow developers to avoid work with shading and graphics primitives. By way of example, SpriteKit 361 is a graphics rendering and animation infrastructure made available by Apple Inc. SpriteKit 361 may be used to animate textured images or "sprites." SceneKit 362 is a 3D-rendering framework from Apple Inc. that supports the import, manipulation, and rendering of 3D assets at a higher level than frameworks having similar capabilities, such as OpenGL. Core Animation 363 is a graphics rendering and animation infrastructure made available from Apple Inc. Core Animation 363 may be used to animate views and other visual elements of an application. Core Graphics 364 is a two-dimensional drawing engine from Apple Inc. Core Graphics 365 provides 2D rendering for applications.

Above the application services layer 380, there is the application layer 375, which may comprise any type of application program. By way of example, FIG. 3 shows three specific applications: photos 371 (a photo management, editing, and sharing program), a Quicken® brand financial management program 372 (Quicken is a registered trademark owned by Intuit Inc.), and an iMovie® brand movie making and sharing program 373 (iMovie is a registered trademark owned by Apple Inc.). Application layer 375 also shows two generic applications 370 and 374, which represent the presence of any other applications that may interact with or be part of the embodiments disclosed herein. An application program, such as application 370, may call into one or more API, service, or framework to display content. Generally, embodiments of the disclosed subject matter employ and/or interact with applications to produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment.

Figure 4:
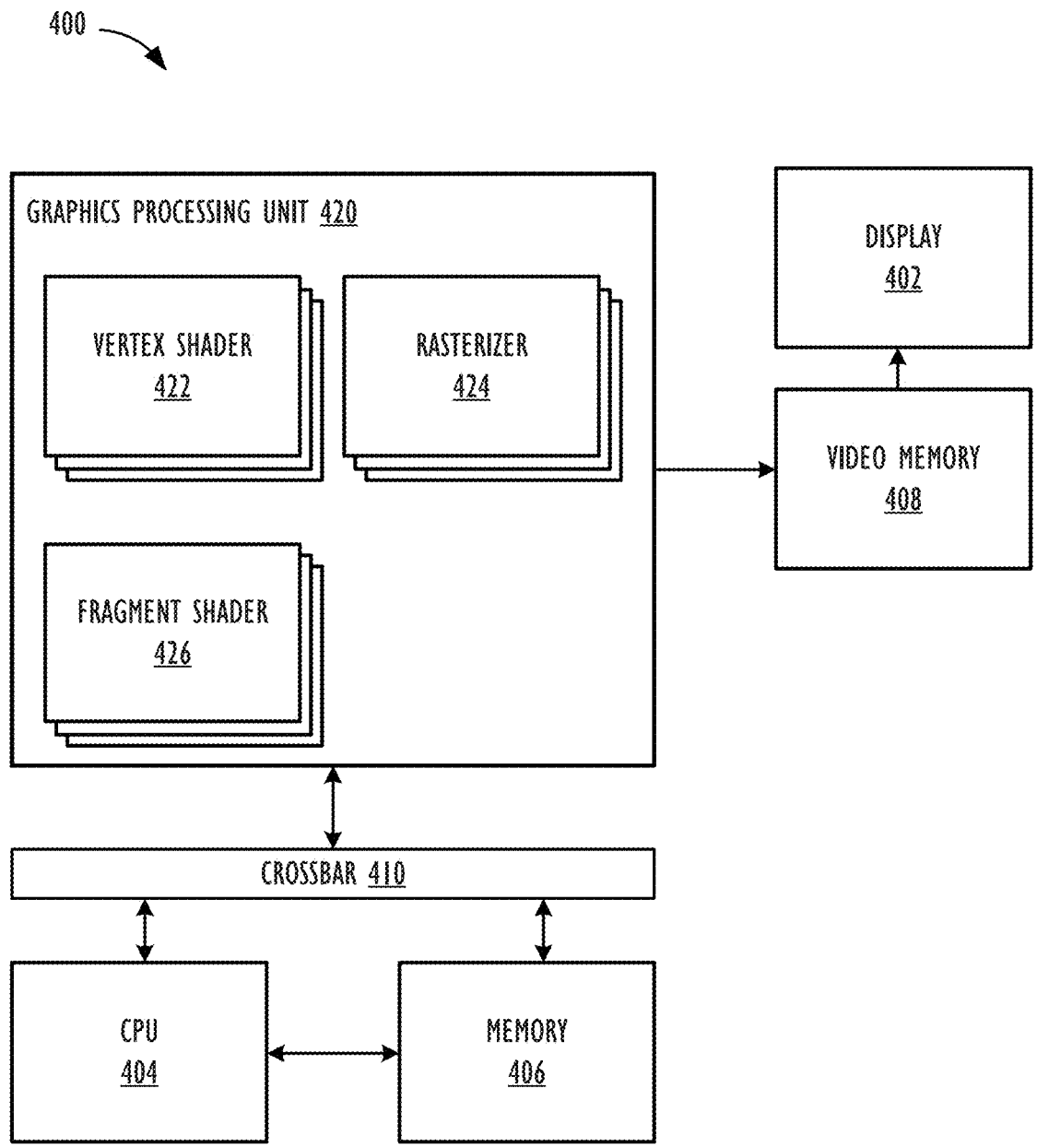
FIG. 4 shows an illustrative graphics system.

Referring to FIG. 4, the disclosed embodiments may be performed by representative graphics system 400. For example, representative graphics system 400 may act to process application data and render graphical representations of virtual objects to a display 402. For example, a CPU 404 may receive a request from application code (not shown) to render a graphic. The request may be via a graphics library and framework, such as Metal 352 or OpenGL 351. The graphic may be a portion of a model of a virtual object comprising one or more polygons, such as a triangle. This request may reference data stored, for example, in memory 406 or video memory 408. The CPU 404 may communicate via bus, switch, or fabric 410 with GPU 420. The GPU 420 may include a graphical pipeline including one or more vertex shaders 422, one or more rasterizers 424, and one or more fragment shaders 426. In some embodiments, a unified memory model may be supported where memory 406 and video memory 408 comprise a single memory utilized by both the GPU 420 and CPU 404 rather than discrete memory systems. As used herein, application code may refer to code executing on CPU 404 during application run time, separate from graphical functions, which may execute on GPU 420. Hardware components of GPU 420, such as shaders, may be programmable, allowing for graphical functions, such as shaders, to execute on GPU 420. API and Driver software, executing on CPU 404 may facilitate interactions between application code and graphical functions, such as by providing an interface between application code and GPU 420 and allowing the application code to set up and execute graphical functions on GPU 420.

Memory storage modes defining storage location and access permissions may be supported by both memory 406 and video memory 408. For example, where a discrete memory model is used, memory 406 may support a shared access mode defining system memory accessible by both the GPU 420 and CPU 404. Video memory 408 may support a private access mode defining at least a portion of video memory 408 as only accessible by the GPU 420. Additionally both memory 406 and video memory 408 may support a managed access mode defining a synchronized memory pair for a resource with one copy of the resource in memory 406 and another copy of the resource in video memory 408. As another example, where the unified memory model is used, the memory 406 may support private and shared access modes where the private mode defines system memory accessible only to the GPU 420 and the shared mode defines system memory accessible by both the GPU 420 and CPU 404.

Generally, the GPU 420 may render a view of a virtual object using the virtual object's model coordinate system. The virtual object may be rendered from the point of view of a camera at a specified location. The vertex shaders 422 perform matrix operations on the coordinates of a particular polygon to determine coordinates at which to render the polygon from the point of view of the camera based on the model coordinates. The rasterizer 424 then determines which pixels of the display are intersected by the polygon. The fragment shader 426 then assigns a color value to each of the pixels intersected by the polygon. This color value may be based, for example, on a particular texture. This texture may be stored in memory 406 or video memory 408. Shaders 422 and 426 may be programmable as a part of a programmable GPU pipeline using shader functions to allow for increased flexibility and functionality of the shaders. This programmability also allows the GPU to perform non-graphical, data-parallel tasks. In certain embodiments, the rasterizer 424 may be a fixed function of the GPU pipeline to allow for increased performance. After the polygon is shaded, the polygon may be written to a frame buffer in video memory 406 for use by the display 402.

According to certain examples, application code, or a higher layer, may request a graphics framework to render a frame for display. Rendering a frame may require one or more rendering passes and multiple graphical API function calls. Graphical API function calls may be used to setup and execute programmable graphical functions such as a rendering pass. A graphical API function call may include information describing one or more virtual objects for display. This description may include resources for use by the rendering pipeline, such as one or more polygons, or primitives, texture information, samples, as well as information defining the state of the rendering pipeline. For example, an application code may attempt to render a virtual object, such as a wall, using a set of vertices describing polygons, which make up an apparent structure of the wall, along with textures which may be placed on the polygons. In setting up the GPU for a render pass, the application code may call a first API to pass polygon information, a second API to pass a texture, and a third API to pass a sampler for use by, for example, a shader function. These resources may then be copied by the graphics driver to a private memory area and used when the shader function is executed during a draw loop. Each API call has a non-insignificant overhead cost associated with its API call. Additionally, where a particular set of resources is used from frame to frame, passing this set of resources repeatedly for multiple API calls over possibly multiple frames may be resource inefficient and time consuming.

Indirect Argument Buffers

Referring to FIGS. 5A-5C, embodiments of the disclosure allow a set of resources of different data types to be grouped and referenced together in an indirect argument buffer (IAB) 502. Rather than passing each resource of a set of resources individually over multiple graphical API calls, the set of resources may be placed in the IAB 502, which allows set of resources of multiple data types to be organized into a single data structure which may be collectively sent to the GPU using a single lightweight graphical API call. As an example, IAB 502 may be a specialized buffer that holds an opaque representation of a set of resources which may be assigned together in a graphical API call. Generally, a buffer may comprise a code object that represents an allocation of unformatted, accessible memory which can contain data. IAB 502 may extend a basic buffer type as a composite data type which allows a grouped list of mixed data types to be stored and referenced together. Application code may instantiate the IAB 502 and assign a set of resources, such as textures, samplers, and buffers, to the IAB 502 for use in one or more graphical API calls. This allows an application code developer to better organize a set of resources for use by certain graphical API calls. Additionally, the IAB 502 may be used for one or more graphical API calls, rather than assigning the resources to each graphical API call individually.

The number, type, and size of data contained in the IAB 502 may be defined by the application code. In certain embodiments, the IAB 502 may, similar to other buffers, contain basic data types, such as floating point and integers, vector data types, matrix data types, arrays of buffer types, structs of buffer types, and inlined constant data. The IAB may also include data types such as pointers to other IABs, textures, samplers, and arrays, both bound an unbound. The IAB may be defined and populated outside of the draw loop. The application code may have fine control over the logical layout of the resources within the IAB (but not the physical layout of the IAB). In this example, the IAB 502 was instantiated with a logical structure defining a set of data type resources. These resources may be laid out in a specific order, here, starting with a texture 504, followed by a sample 506, and ending with a pointer 508. IAB 502 may also more than one of a single data type such as additional textures 504, or samples 506. IABs may also reference another IAB. For example, IAB 502 may reference another IAB (not shown) using a pointer 508 to the other IAB. Pointers may also be utilized to reference other data types, such as other types of buffers. This set of resources may then be passed together in a single API call for processing by, for example, a shader in a rendering pipeline. IAB 502 may be passed via an API call A, for example, to graphical function A 522 for execution in GPU pipeline state A 520 (see FIG. 5B). In accordance with this disclosure, the set of resources passed by API call A may be used again by another graphical function B 532. As shown in FIG. 5C the IAB 502 may also be passed via API call B for execution in GPU pipeline state B 530.

An IAB may be instantiated by application code using a particular logical layout for one or more types of resources and, after compilation, passed to the GPU via an encoder. According to certain aspects, where this application code is compiled, a compiler, in conjunction with a driver for the GPU, may re-index (e.g., reorder) and change the structure of the IAB such that the physical manifestation of the IAB is different from the logical structure of the IAB. An indication of this re-indexing may be provided, such as flags or hints, which enables an encoder to lay out and encode the re-indexed IAB. At run time, the encoder may encode the IAB into a GPU language, such as a shader language, using the regular structure of the shading language such that the IAB appears no different in the shading language than other structures. This structural consistency allows, for example, shaders to reference specific parts of an IAB as if the IAB were a regular shader structure. Once encoded, the layout of both IAB 602 and 622 may be fixed and no additional changes to the structure or re-indexing may occur. A person having ordinary skill in the art may appreciate that a compiler may be used to transform application code into computer languages other than binary or object code, such as an intermediary representation without departing from aspects of this disclosure.

Generally, a texture is composed of pixel data and metadata related to the pixel data. According to certain aspects, this metadata may be encoded in the IAB and the actual pixel data may be stored separately. This metadata may include, for example, texture state information (e.g., dimensions, format, etc.). The metadata may also include a pointer to separately stored pixel data. In other cases, the encoded IAB may contain a pointer to the metadata, which may then point to separately stored pixel data. In other cases, the encoded IAB may contain both the metadata and the actual pixel data.

Figure 6:
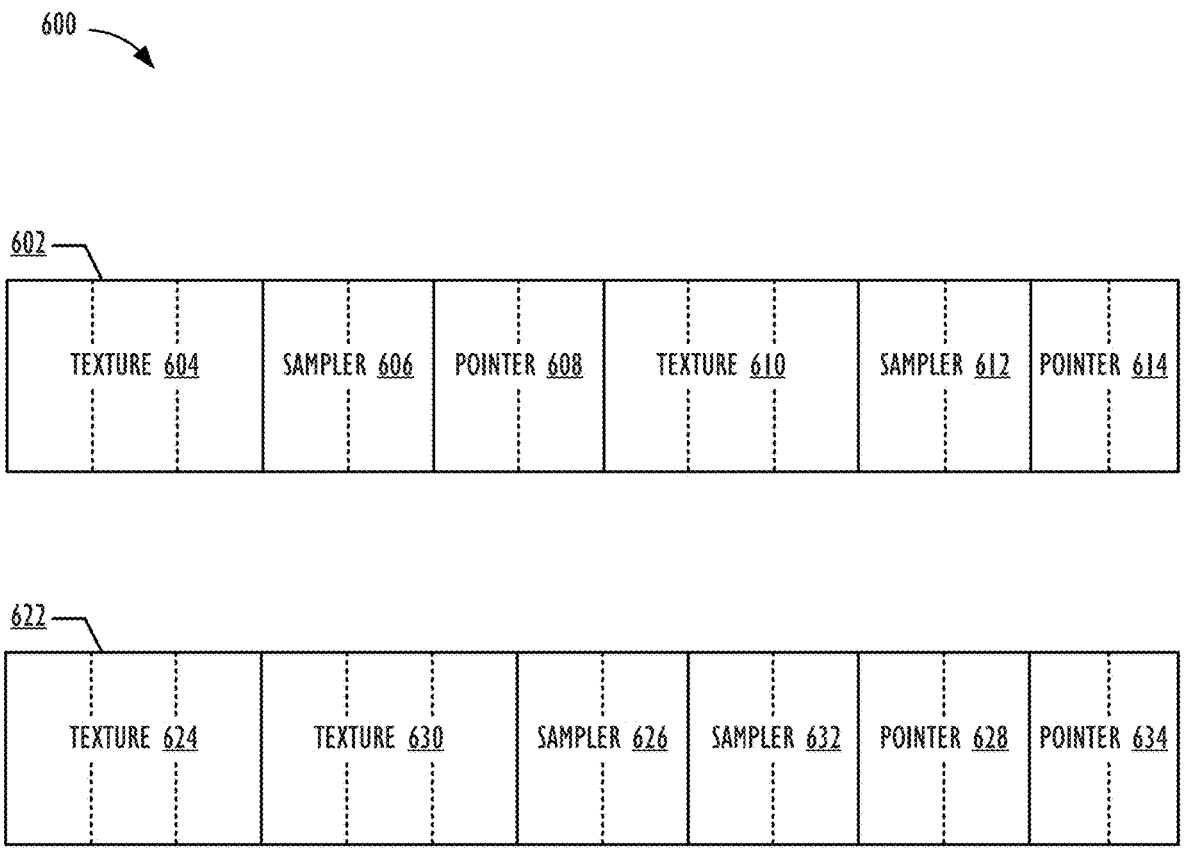
FIG. 6 is a block diagram illustrating re-indexing, according to an embodiment.

FIG. 6 is a block diagram illustrating re-indexing 600, according to an embodiment. In certain cases, the compiler in conjunction with a GPU driver may modify the physical layout of an IAB 602. This modification may be made to take into account physical characteristics of the GPU, such as the width of available data channels, GPU pipeline length, etc. For example, application code may organize an IAB 602 by declaring IAB 602 having a first texture 604 with an index of 1, with an associated first sampler 606 with an index of 2, and an associated first pointer 608 with an index of 3, along with a second texture 610 with an index of 4, an associated second sampler 612 with an index of 5, and an associated second pointer 614 with an index of 6. During compilation of the application code, a compiler may indicate that IAB 602 may be re-indexed, for example, based on a set flag or configuration, or a determination based on the application code being compiled. This re-indexing may help optimize GPU performance. For example, certain GPUs may benefit from clustered data types. In such a case, at run time, the driver may re-index the IAB 602 to arrange the data types in such an order, such as shown in IAB 622, with a first texture 624 with an index of 1, a second texture 630 with an index of 2, a first sampler 626 with an index of 3, a second sample 632 with an index of 4, a first pointer 628 with an index of 5, and a second pointer 634 with an index of 6. This re-indexing may be transparent to the application code and the driver or API may maintain a mapping, such as a mapping table, of the re-indexing. The GPU function may then access the IAB 622 using the re-indexed structure directly without referencing the original structure of IAB 602 or the mapping table. As the encoder object may be aware of the layout used by the driver and for different pipeline states, the driver may index IAB 602 in exactly the same way each time. The application code may continue to use the indexing of IAB 602 in referencing specific resources in IAB 602 without being aware of the re-indexing.

Figure 7:
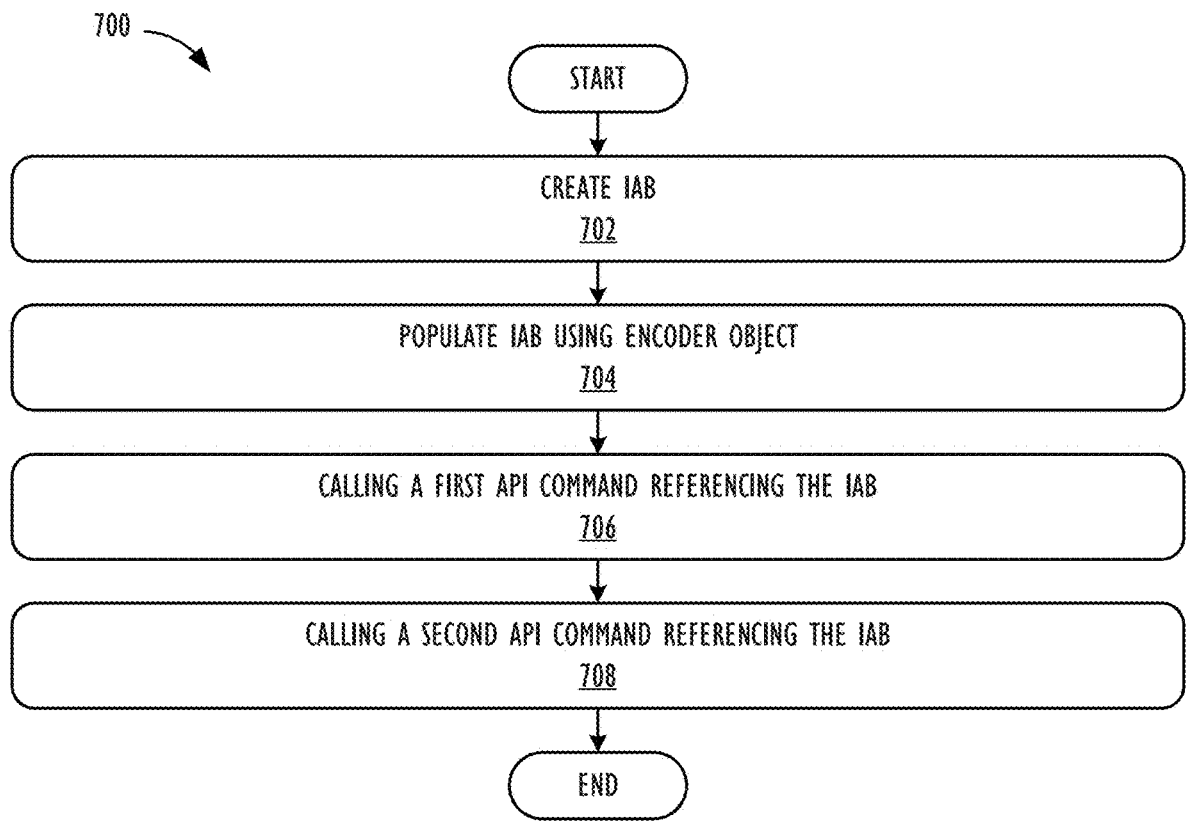
FIG. 7 is a flow diagram illustrating a technique for utilizing indirect argument buffers, according to an embodiment.

FIG. 7 is a flow diagram 700 illustrating a technique for indirect argument buffers according to an embodiment. At 702, application code may create an IAB having two or more data objects of a supported type. The application code may also specify an index attribute n (for example, a 32-bit unsigned integer) that may be used to identify a specific resource within the IAB. The application code may receive an IAB allocated in a shared memory space accessible by both the GPU and the CPU. Where a shared memory space is not utilized, the IAB may be created in memory accessible to the CPU. At 704, after the IAB is created, the application code may populate the IAB memory space with resources. This population may be performed using an encoder object to write to the IAB. The encoder object may be used to write to the IAB as the application code may not know the physical memory layout of the IAB. While the application code is able to access specific resources within the IAB, the driver may re-index the IAB as needed based on, for example, hardware limitations. Where shared memory space is not utilized, the IAB may be copied into a private memory space accessible only to the GPU upon encoding.

After the IAB is encoded, the driver may be made aware of the IAB via a graphical API call referencing the IAB. According to certain aspects, the graphical API call may both encode and reference the IAB. At 706, the application code may call a first API command referencing the IAB and passing the IAB to the GPU. The GPU may then perform an action associated with the first API command, such as a shader function using resources in the IAB. In certain cases, a particular graphical function may just use the resources that it needs. Not all the resources in the IAB may be used by the particular graphical function. The GPU may also write data, such as graphical function outputs or results to the IAB. At 708, the application code may call a second API command passing the IAB. The GPU may then perform an action associated with the second API command using resources in the IAB; such resources could have been placed into the IAB during acts in accordance with block 704 or by the GPU itself during acts in accordance with block 706.

Figure 8:
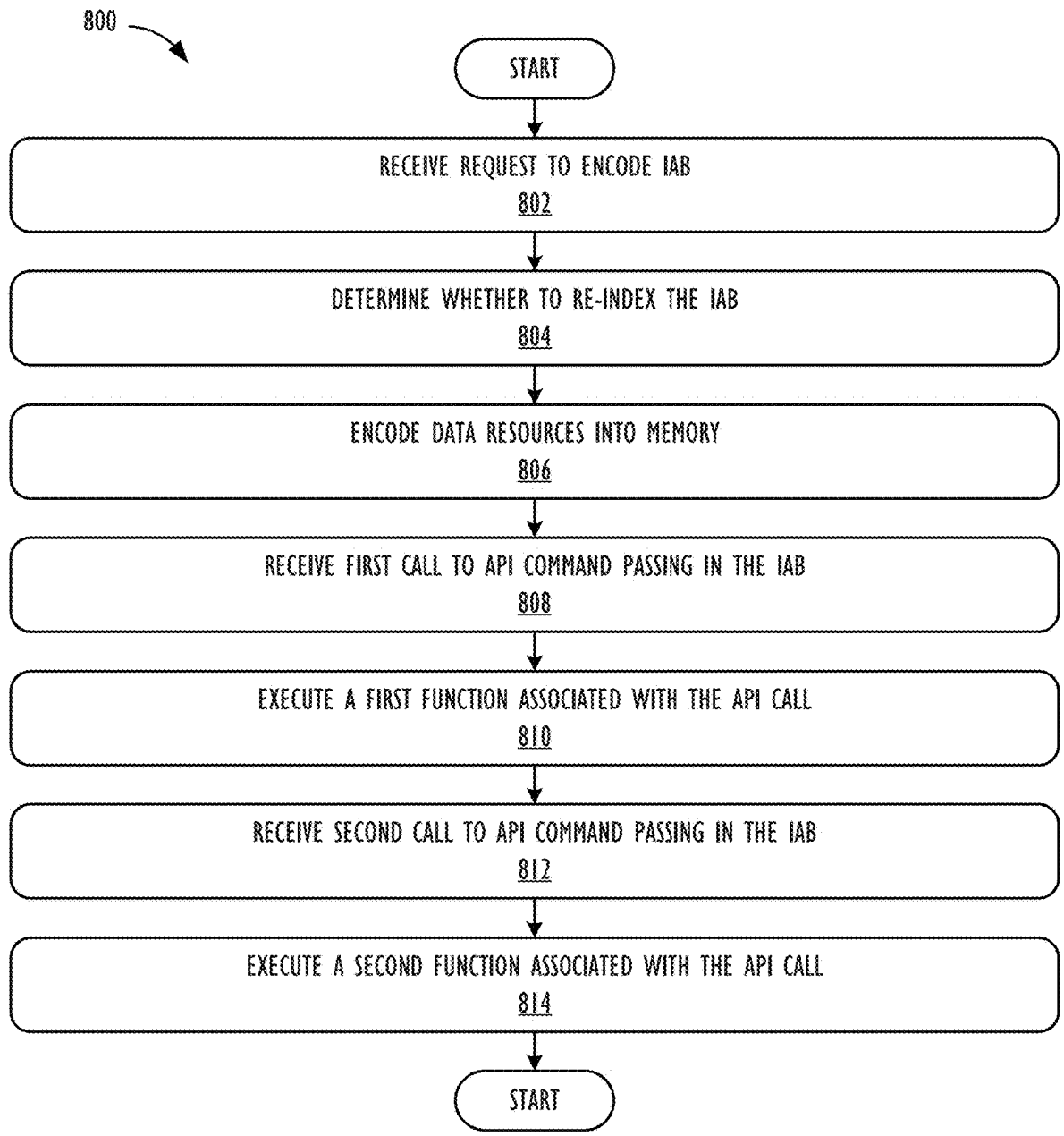
FIG. 8 is a flow diagram illustrating a technique for encoding indirect argument buffers, according to another embodiment.

FIG. 8 is a flow diagram 800 illustrating a technique for encoding indirect argument buffers, according to another embodiment. At 802, a computing system may receive a request to encode a data structure into a graphics processing language, the data structure for grouping two or more data resources, the request having an indication that the data structure may be re-indexed. At 804, the computing system may determine whether to re-index the data structure based on one or more characteristics of the graphics processor. At 806, the computing system may encode resources to populate an IAB. At 808, the computing system may receive a first call to an API command passing in the IAB. At 810, the computing system may execute a first function associated with the API call on the GPU. The first function may access one or more resources in the IAB. At 812, the computing system may receive a second call to an API command passing in the IAB. At 814, the computing system may execute a second function associated with the API call on the GPU. The second function may also access one or more resources in the IAB.

As the IAB may be instantiated outside a draw loop, the overhead required to track the residency of the IAB resources may be reduced. An object associated with a resource may be considered resident when the object is accessible by the GPU. Ordinarily, this occurs during the creation of a graphical API object based on resources passed to the GPU via a graphical API call. On graphical API object destruction, the graphical API object may be removed and is no longer resident as the object is no longer accessible to the GPU. The graphics driver generally tracks object residency on a per graphical API basis. For resources included in the IAB, residency of these resources may be established as a part of instantiating the IAB object once for each rendering pass rather than multiple times over multiple API calls for a single rendering pass. By establishing residency during instantiation, the application developer is able to control and track resource residency and have better visibility regarding the resources used for a rendering or compute pass. Additionally, as the IAB may be created outside of the draw loop, the set of resources may be encoded to shading language arguments once rather than for each time the set of resources are required. The IAB may also be allocated from a heap to further reduce the residency cost.

According to certain aspects the GPU may modify the IAB, allowing for GPU driven pipelines and indirect or multi-draw indirect graphical functions to be executed by the GPU. For example, an output of a shader function may be written into the IAB and used as input for another graphical API call. As another example, an IAB may be encoded without resources and a graphical function may populate the IAB during runtime for use by another graphical function. As an example, the limit on the number of resources that may be placed in an IAB may be set to a larger number dynamically or set to a relatively large number by default or in response to an argument. Additionally, unbound arrays may be used in an IAB.

Generally, a graphical function executing on the GPU may modify IABs as needed, including IABs referenced within a command buffer itself. However, application code executing on the CPU generally may not modify the IAB safely between the time that the command buffer referencing the IAB is committed and the time the GPU has completed the command buffer as the application code is generally unable to determine the state of graphical functions during this time.

In certain cases, it may be known that neither the application code nor graphical functions will modify an IAB from the time that the IAB is assigned as a graphical API argument until the time the GPU has completed execution of the command buffer. In such cases, the IAB may be considered immutable. For example, a flag may be set when compiling or the compiler may determine during compilation that an IAB is immutable. In such cases, the compiler and driver may be able to perform certain optimizations and a hint may be added to a pipeline descriptor to identify IABs that are mutable. This hint may be used by the GPU at run time to optimize execution of a particular pipeline based on whether the IAB is mutable or immutable. In one embodiment, if this hint is not specified, it may be assumed that IABs are immutable by default.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the disclosed subject matter, therefore, should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A computer-implemented method for task execution on a graphics processor, the method comprising:
    creating a data structure for grouping data resources;
    populating the data structure with two or more data resources for encoding into a graphics processing language by an encoding object, wherein the data structure is ordered based on an index associated with each data resource, and wherein the encoding object is configured to reorder the data structure by changing the index associated with at least one of the data structure's data resources;
    passing the data structure to at least one programming interface command, the at least one programming interface command configured to access the data structure's data resources; and
    triggering execution of least one function on the graphics processer in response to passing the data structure to the at least one programming interface command.

2. The computer-implemented method of claim 1, wherein the data structure is stored in a shared memory space accessible by both a central processor and the graphics processor.

3. The computer-implemented method of claim 2, wherein the encoding object is configured to reorder the data structure based on a physical characteristic of the graphics processor.

4. The computer-implemented method of claim 1, further comprising modifying data in the data structure based on processing the at least one programming interface command.

5. The computer-implemented method of claim 1, wherein triggering execution of the at least one function on the graphics processor further comprises modifying, by the graphics processor, at least some of the data structure's data resources.

6. The computer-implemented method of claim 1, wherein the two or more data resources are of two or more data types.

7. The computer-implemented method of claim 1, wherein the at least one programming interface command is a first programming interface command, and wherein the at least one function is a first function whose execution is triggered on the graphics processor in response to passing the data structure to the first programming interface command, and wherein the method further comprises:
    passing the data structure to a second programming interface command, the second programming interface command configured to access the data structure's data resources; and
    triggering execution of a second function on the graphics processer in response to passing the data structure to the second programming interface command.

8. The computer-implemented method of claim 7, wherein the first function is different from the second function.

9. The computer-implemented method of claim 7, wherein the first function is configured to modify at least one of the data structure's data resources to create a modified data structure, and wherein the modified data structure is passed to the second programming interface command.

10. A non-transitory program storage device, readable by a processor and comprising instructions stored thereon to cause one or more processors to:
    create a data structure for grouping data resources;
    populate the data structure with two or more data resources for encoding into a graphics processing language by an encoding object, wherein the data structure is ordered based on an index associated with each data resource, and wherein the encoding object is configured to reorder the data structure by changing the index associated with at least one of the data structure's data resources;

pass the data structure to at least one programming interface command, the at least one programming interface command configured to access the data structure's data resources; and trigger execution of at least one function on a graphics processer in response to passing the data structure to the at least one programming interface command.

11. The non-transitory program storage device of claim 10, wherein the data structure is stored in a shared memory space accessible by both a central processor and the graphics processor.

12. The non-transitory program storage device of claim 10, wherein the encoding object is configured to reorder the data structure based on a physical characteristic of the graphics processor.

13. The non-transitory program storage device of claim 10, further comprising instructions stored thereon to cause the one or more processors to modify data in the data structure based on processing the at least one programming interface command.

14. The non-transitory program storage device of claim 10, wherein triggering execution of the at least one function on the graphics processor further comprises modifying, by the graphics processor, at least some of the data structure's data resources.

15. The non-transitory program storage device of claim 10, wherein the at least one programming interface command is a first programming interface command, and wherein the at least one function is a first function whose execution is triggered on the graphics processor in response to passing the data structure to the first programming interface command, and wherein the non-transitory program storage device further comprises instructions stored thereon to cause the one or more processors to:

pass the data structure to a second programming interface command, the second programming interface command configured to access the data structure's data resources; and trigger execution of a second function on the graphics processer in response to passing the data structure to the second programming interface command.

16. The non-transitory program storage device of claim 15, wherein the first function is different from the second function.

17. The non-transitory program storage device of claim 15, wherein the first function is configured to modify at least one of the data structure's data resources to create a modified data structure, and wherein the instructions cause the one or more processors to pass the modified data structure to the second programming interface command.

18. A computer system comprising:
a graphics processor;
memory;
one or more processors operatively coupled to the memory and the graphics processor, the memory comprising instructions that cause the one or more processors to:
create a data structure for grouping data resources;
populate the data structure with two or more data resources for encoding into a graphics processing language by an encoding object, wherein the data structure is ordered based on an index associated with each data resource, and wherein the encoding object is configured to reorder the data structure by changing the index associated with at least one of the data structure's data resources;
pass the data structure to at least one programming interface command, the at least one programming interface command configured to access the data structure's data resources; and
trigger execution of at least one function on the graphics processer in response to passing the data structure to the at least one programming interface command.

19. The computer system of claim 18, wherein the encoding object is configured to reorder the data structure based on a physical characteristic of the graphics processor.

20. The computer system of claim 18, wherein the at least one programming interface command is a first programming interface command, and wherein the at least one function is a first function whose execution is triggered on the graphics processor in response to passing the data structure to the first programming interface command, and wherein the memory further comprises instructions that cause the one or more processors to:
pass the data structure to a second programming interface command, the second programming interface command configured to access the data structure's data resources; and
trigger execution of a second function on the graphics processer in response to passing the data structure to the second programming interface command.

21. The computer system of claim 20, wherein the first function is configured to modify at least one of the data structure's data resources to create a modified data structure, and wherein the modified data structure is passed to the second programming interface command.

* * * * *